United States Patent [19]

Degenhardt

[11] 4,415,471

[45] Nov. 15, 1983

[54] X-RAY FLUORESCENT SCREENS

[75] Inventor: Heinz Degenhardt, Erlangen, Fed. Rep. of Germany

[73] Assignee: Siemens Aktiengesellschaft, Berlin & Munich, Fed. Rep. of Germany

[21] Appl. No.: 352,327

[22] Filed: Feb. 25, 1982

[30] Foreign Application Priority Data

Apr. 9, 1981 [DE] Fed. Rep. of Germany ....... 3114438

[51] Int. Cl.[3] .............................................. C09K 11/06

[52] U.S. Cl. ................................ 252/301.36; 428/691

[58] Field of Search ....................... 252/301.18, 301.36; 428/691

[56] References Cited

U.S. PATENT DOCUMENTS 2,385,615 9/1945 Dreyer ........................... 252/301.16

3,895,157 7/1975 Brixner et al. ............. 252/301.36 X 4,138,361 2/1979 Suys et al. ....................... 252/301.33

4,316,817 2/1982 Cusano et al. ................. 252/301.18

FOREIGN PATENT DOCUMENTS 521338 1/1954 Belgium ............................ 252/301.36

*Primary Examiner*—F. Edmundson

*Attorney, Agent, or Firm*—Hill, Van Santen, Steadman & Simpson

[57] ABSTRACT

Improved x-ray fluorescent screens include a fluorescent layer having luminescent material bound with a lacquer binding agent characterized by pronounced hydrophilic properties. A preferred binding agent is pure urea-formaldehyde resin which solidifies with heat through a polycondensation reaction. Additives, such as alkyd resins, epoxy resins, polyacrylate resins, nitrocellulose, vinyl chloride copolymers, or polyvinyl butyral can be added to the binding agent. The binding agent prevents agglomerations of the luminescent material crystals so that a more uniform emission of light occurs.

6 Claims, 2 Drawing Figures

X-RAY FLUORESCENT SCREENS

BACKGROUND OF THE INVENTION

1. Field of the Invention

The invention relates to x-ray fluorescent screens which can be utilized as intensifying screens and somewhat more particularly to improve fluorescent screens of the type having improved image homogeneity.

2. Prior Art

X-ray fluorescent screens which can be used as intensifier screens are known, for example, from U.S. Pat. No. 2,819,183.

The fluorescent coating of such x-ray fluorescent screens, particularly those which are associated with an x-ray film to improve the sensitivity of a radiographic set-up (i.e., used as so-called intensifier screens), consist of phosphor particles dispersed in a lacquer-like binding agent. However, typical binding agents fail to provide a uniform distribution of phosphor particles. Such non-uniform phosphor particle distribution causes grainy images whose information (detail content) is reduced.

This non-uniform distribution of luminescent pigment particles is, as a rule, caused by a so-called flocculation of individual pigment crystalites. Flocculation is caused, for example, by the hydrophilic behaviour of luminescent pigments, i.e., the particles of pigment are coated with a thin film of water. When such particles are brought into contact with a hydrophobic solvent, typically utilized in lacquer binding agents, the phosphor particles have a tendency to cluster together by way of their film of water and form small crystal colonies. The agglomeration of such crystalites is very close and leads to tightly packed clumps.

When x-rays impinge on such crystalite clumps, they exhibit a stronger absorption in comparison to adjacent screen material and then also luminesce more brightly than portions of the fluorescent screen permeated only by simple small crystals (such portions are less tightly packed with phosphor particles). As a result, on an associated x-ray film, black spots are generated at those locations at which crystal clumps are present. This phenomena, observed over the entire surface of the film, leads to the earlier-referenced interfering image graininess.

In order to eliminate this clumping together of luminescent materials, i.e., in order to achieve a homogeneous distribution of the luminescent pigment particles in a lacquer binding system, various additives have heretofore been utilized. Generally, such additives are wetting agents and/or dispersion agents. These agents bind the hydrophilic pigments with the hydrophobic lacquer systems. Dispersion agents comprise, for example, phosphoric polyamine amides. A disadvantage of such additives is that they unfavorably alter the physical properties of the binding agents. For example, they impair the hardness of the surface, the electrostatic behaviour, the flexibility, etc., and also impair the stability of the binding agents against corrosion and humidity.

SUMMARY OF THE INVENTION

The invention provides x-ray fluorescent screens which can be utilized as intensifying screens and which have an improved image homogeneity.

In accordance with the principles of the invention, luminescent materials in a fluorescent layer of an x-ray flourescent screen are bound in a lacquer binding system having pronounced hydrophilic properties. In preferred embodiments of the invention, such lacquer binding systems solidify through a polycondensation reaction, which eliminates water. A preferred binding system of this type is pure urea-formaldehyde resin, which solidifies with heat through a polycondensation reaction.

In certain embodiments of the invention, the urea-formaldehyde resin can contain about 10 to 90% by weight, preferably about 50% by weight, of an additive selected from the group consisting of alkyd resins, epoxy resins, polyacrylate resins, nitrocellulose, vinyl chloride-copolymers, polyvinyl butyral and mixtures thereof.

In embodiments of the invention where rare earth luminescent materials having oxyhalides and/or oxysulfides as a base are utilized, a preferred binding agent comprises a urea-formaldehyde resin containing 10 to 90% by weight, preferably about 50% by weight of polyvinyl butyral.

In certain embodiments of the invention, the free surface of a fluorescent layer containing luminescent materials bound with a lacquer binding system having pronounced hydrophilic properties is coated with a protected layer composed of a lacquer system having pronounced hydrophilic properties, such as polyvinyl chloride.

In accordance with the principles of the invention, during the manufacture of a fluorescent coating or layer for x-ray fluorescent screens, suitable binding agents are utilized so that wetting and/or dispersion agents are not required. Experiments have shown that lacquer systems which exhibit pronounced hydrophilic properties are especially useful in this regard. Such systems are, preferably, those that undergo a polycondensation reaction during solidification and thus themselves eliminate water. In this manner, formation of crystal colonies can be prevented and an extremely homogeneous distribution of phosphor particles achieved within a fluorescent layer.

In a presently preferred exemplary embodiment of the invention, pure urea-formaldehyde resins which solidify with heat through polycondensation are utilized as the luminescent material binding system. In this regard, an exemplary fluorescent coating can be produced by admixing about 60 grams of urea-formaldehyde resin, as the binding agent, contained in butanol to form a 60% solution, with about 100 grams of a known lanthanum oxybromide luminescent material and homogonizing the resultant admixture for about 30 minutes. After rapid aggitation, a 0.5 mm thick layer of this admixture can be applied by a spreading device (doctor blade) on a 0.5 micron thick polyester film and heated to about +120° C. for solidification. After cooling, the thus obtained fluorescent layer is immediately utilizable because, through the polycondensation reaction, a solid, virtually inpenetrable layer is already obtained. Only the application of a protective layer, known per se, might be advantageous as a rule. Such protective layer can, for example, be composed of a lacquer coating of polyvinyl chloride.

Because of the brittleness of urea-formaldehyde resins, it is advantageous, particularly in the case of intensifying screens which are occasionally bent during handling, to admix the urea-formaldehyde with other resins or to plasticize (soften) the urea-formaldehyde with correspondingly compatible softening agents.

A very good distribution of phosphor pigments can be obtained with a mixture of urea-formaldehyde and about 10 to 90% by weight, preferably about 50% by weight, of an alkyd resin. Preferably, alkyd resins which are as oil-free as possible are utilized. A preferred group of such resins is the urethane-alkyd resins.

Other additive resins useful for admixing with the binding system of the invention can be selected from the group consisting of epoxy resins, polyacrylate resins, nitrocellulose, vinyl chloride copolymers, polyvinyl butyral, and mixtures thereof. Preferred from this group is polyvinyl butyral, which has provided excellent results.

With luminescent materials comprised of rare earths having oxyhalides and/or oxysulfides as a base, which are presently preferred in x-ray intensifying screens, an excellent distribution of pigment is achieved with the inventive binding system.

An exemplary formulation in accordance with the principles of the invention for manufacture of fluorescent screens with mixed resins comprising an admixture of the following materials:

| | |
|---|---|
| 50 gr | urea-formaldehyde resin, 60% in butanol |
| 50 gr | polyvinyl butyral |
| 100 ml | butyl acetate |
| 100 ml | methyl glycol acetate |
| 500 gr | yttrium oxysulfide luminescent material |

In addition to the improved image homogeneity obtained by practicing the principles of the invention, the brightness characteristic, i.e., the intensification efficiency, is also improved. Thus, an intensifying screen produced from the aforecited exemplary formulation exhibits a 30 to 40% higher intensification efficiency than a similar screen produced with the same luminescent material under the same conditions, but utilizing an acrylate resin binder. Film density of an intensifier screen containing about 40 mg/cm$^2$ of yttrium oxysulfide luminescent material and produced in accordance with the above exemplary formulation, after excitation with 77 kV x-rays and 22 mm overall aluminum filtering, was equal to the film density of an essentially identical screen containing 70 mg/cm$^2$ of the same luminescent material in an acrylate binding system or in a PVC (polyvinyl chloride) binding system. As is apparent from the foregoing, a significant savings of luminescent material is obtainable by following the principles of the invention without have to put-up with a decrease of intensification efficiency. Rather, a thinner fluorescent coating thickness yields a reduced scattering and hence provides improved images, given otherwise equal conditions.

The improved light efficiency of screens having urea-formaldehyde resin binding systems is directly attributable to the more uniform distribution of luminescent materials therein. This can be explained by the fact that such resin molecules, because of their good wettability, push themselves between the individual crystalites and thus provide an improved dissemination of light toward the exterior.

Intensifying screens produced in accordance with the principles of the invention, after utlization in taking radiographic images, can be more simply separated from the x-ray film than conventional intensifying screens. This is important, particularly with so-called daylight systems wherein the film and screen are stored pressed together over longer periods of time. Easy detachability can be further promoted by applying a protective layer composed of the novel binding system of the invention into appropriate surfaces of an intensifying screen.

DESCRIPTION OF PREFERRED EMBODIMENTS

Figure 1:
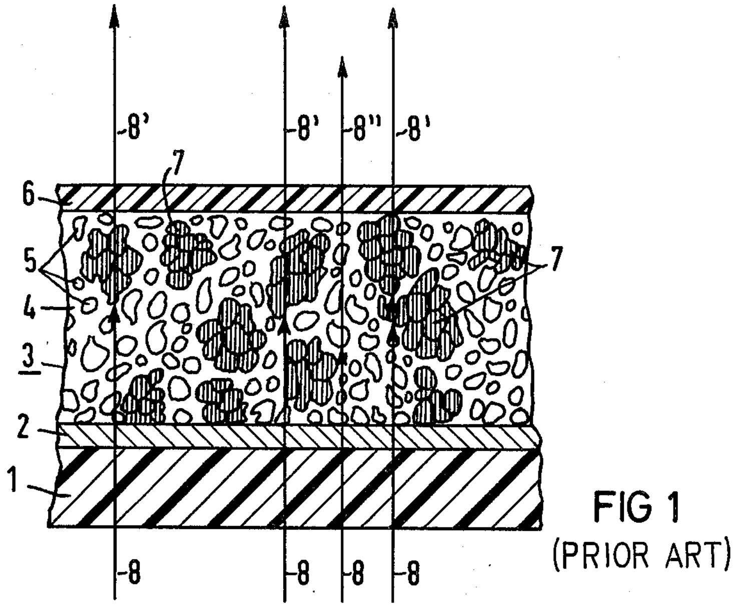
FIG 1 (PRIOR ART)
FIG. 1 is an enlarged, partial, cross-sectional view of a fluorescent screen produced with known binding agents, with x-rays passing therethrough, as in an intensifying screen.

In the drawings, similar reference numerals are utilized to designate similar parts.

A 0.25 μm thick substrate 1 composed of a polyester is coated with a 0.02 mm reflective layer 2 composed of titanium dioxide. A fluorescent layer 3 is positioned on the reflective layer 2. The layer 3 contains luminescent crystals 5 in a binding agent 4. The free surface of the fluorescent layer 3 is covered with a 0.01 mm protective layer 6, composed of PVC.

In FIG. 1, the fluorescent layer 3, formulated with known techniques, contains luminescent crystals 5 which have clustered together to form clumps 7. X-ray radiation, schematically indicated by arrows 8, to be converted passes through the screen and releases varying intensity luminescent light, schematically indicated by arrows 8' and 8''.

The operation of the known intensifying screen shown in FIG. 1 is based on a fact that, with penetration of x-rays 8 into the fluorescent layer 3, light 8' and 8'' is generated in the phosphor crystals 5, which light then passes through the protective layer 7 and impinges on a radiographic film (not shown) positioned on the free surface of layer 7. The resultant non-uniform brightness, i.e., graininess of the radiograph, results from the fact that several phosphor crystals are concentrated in clumps 7 so that more light 8' eminates from these densely packed regions of clumps 7 than light 8'' from the surrounding areas and earlier-referenced graininess results. In order to schematically illustrate this phenomena, arrows 8' are shown longer than arrows 8''.

Figure 2:
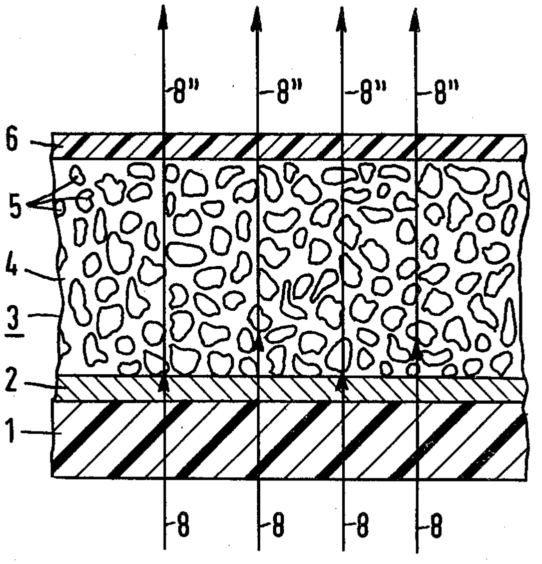
FIG. 2 is a somewhat similar view of a fluorescent screen produced in accordance with the principles of the invention.

FIG. 2 illustrates, in principle, a fluorescent screen produced in accordance with principles of the invention and is quite similar to that explained in conjunction with FIG. 1. However, as is apparent from FIG. 2, the inventive screen does not include phosphor crystal clumps 7. Accordingly, the eminating luminescent light, schematically indicated by arrows 8'', is uniform so that all of the arrows 8'' are shown of equal length. Thus, it can be recognized that the luminescent light of uniformaly distributed phosphor crystals can pass through the binding system of the invention, without being disturbed by crystal clumps, uniformly toward the exterior in an unobstructed fashion over the entire surface area of the screen.

As is apparent from the foregoing specification, the present invention is susceptible of being embodied with various alterations and modifications which may differ particularly from those that have been described in the preceding specification and description. For this reasons, it is to be fully understood that all of the foregoing is to be merely illustrative and is not to be construed or interpreted as being restrictive or otherwise limiting of the present invention, excepting as it is set forth and defined in the hereto-appended claims.

I claim as my invention:

1. An x-ray fluorescent screen comprised of a fluorescent layer having a luminescent material bound in a lacquer binding system characterized by pronounced hydrophilic properties, said luminescent material comprising a rare earth luminescent material having oxyhalides and/or oxysulfides as a base, and said binding system comprising a urea-formaldehyde resin containing about 10 to 90% by weight of an additive selected from the group consisting of alkyd resins, epoxy resins, polyacrylate resins, nitrocellulose, vinyl chloride copolymers, polyvinyl butyral and mixtures thereof.

2. A fluorescent screen as defined in claim 1 wherein said urea-formaldehyde resin contains about 10 to 90% by weight of polyvinyl butyral.

3. A fluorescent screen as defined in claim 2, wherein said urea-formaldehyde resin contains about 50% by weight of polyvinyl butural.

4. A fluorescent screen as defined in claim 1 wherein said urea-formaldehyde resin contains about 50% by weight of said additive.

5. A fluorescent screen as defined in claim 1 wherein said urea-formaldehyde resin contains about 10 to 90% by weight of an urethane-alkyd resin.

6. An x-ray fluorescent screen useful as an intensifying screen comprised of a substantially uniform mixture of yttrium oxysulfide luminescent material, urea-formaldehyde resin, polyvinyl butyral, butyl acetate and methyl glycol acetate.

* * * * *